Dec. 13, 1966 J. GAYNOR 3,291,601

PROCESS OF INFORMATION STORAGE ON DEFORMABLE PHOTOCONDUCTIVE MEDIUM

Filed Dec. 29, 1960 2 Sheets-Sheet 1

Inventor:
Joseph Gaynor,
by Paul A. Frank
His Attorney.

Inventor:
Joseph Gaynor,
by Paul A. Frank
His Attorney.

United States Patent Office 3,291,601
Patented Dec. 13, 1966

3,291,601

PROCESS OF INFORMATION STORAGE ON DEFORMABLE PHOTOCONDUCTIVE MEDIUM

Joseph Gaynor, Schenectady, N.Y., assignor to General Electric Company, a corporation of New York Filed Dec. 29, 1960, Ser. No. 79,260
4 Claims. (Cl. 96—1.1)

The present invention pertains to a method and apparatus for storing information on a deformable storage medium in the form of permanent physical deformations. More particularly, the invention pertains to a system which provides for the direct deposition, development, and storage of the information on the same deformable medium.

The recording of information on a deformable medium in the form of minute light modifying deformations is known. By one such method of information storage, the deformations are formed on the storage medium by using an electron beam to deposit electrostatic charges on the medium surface in a pattern representing the information to be stored. The deformable storage medium is then softened by the application of heat or the like and the forces due to the electrostatic charge pattern deform the softened material to produce physical deformations corresponding to the charge pattern. Upon cooling the medium, the deformations become permanently fixed on the surface of the storage medium and are thereby permanently stored unless deliberately erased by reheating. The information stored in the form of these deformations is retrieved by projecting a beam of light through the medium. The projected light is deflected or refracted by the deformations, depending on their nature, to produce a spatial light image corresponding to the original image. The spatial light image may be viewed directly or be converted to electrical signals by means of such known light sensing devices as photomultipliers or the like. A complete disclosure of such a system may be found in U.S. Patent No. 3,113,179, issued on December 3, 1963, to William E. Glenn, entitled "Method and Apparatus for Recording," filed February 15, 1960, Serial No. 8,842, now abandoned and assigned to the assignee of the present invention.

A newer method stores information more directly by first recording light images such as photographs and television pictures on a photoconductor and thereafter permanently recording such images by transferring the image pattern to the deformable medium. By this method, the complex and expensive circuitry required to convert information from a light image to electrical form as in the first method is avoided. The newer method employs a photoconductive temporary storage element such as selenium, which is uniformly charged and then exposed to the light image to be stored. The impinging light image so modifies the electrical characteristics of the photoconductive element that a portion of the charge leaks off selectively in accordance with the light characteristics of the image. This charge pattern is then transferred to a deformable storage medium, such as a thermoplastic film, by applying a polarizing transfer voltage between the photosensitive element and the thermoplastic medium. The charge pattern on the deformable storage medium is then developed by softening the thermoplastic film so that the forces due to the electrostatic charge pattern deform the thermoplastic medium to form corresponding deformations.

It would be desirable to proceed directly from the light image to development and storage on a deformable medium without the intervening step of temporarily storing the light image. The use of a temporary storage medium adds to the complexity of any method and apparatus for information storage and is, therefore, a step which should be eliminated, if possible. More specifically, transfer of a light image from a temporary storage medium to a deformable medium contemplates a contiguous relationship during transfer between the individual elements employed for temporary storage and final storage. This introduces not only mechanical positioning problems into the process and apparatus but also introduces mechanical motion problems as well. Since the present type information process can be restricted solely to the movement of electrical and optical signals, the introduction of mechanical motion has the tendency to reduce the speed of the entire storage process to any mechanical speeds involved. For these and other reasons, it is desirable to directly deposit a light image on a deformable medium without necessity for an intervening temporary storage medium.

It is a primary object of the invention, therefore, to provide a method and apparatus for the direct deposition, development, and storage of information on the same deformable medium.

It is still another object of the invention to provide a more simplified apparatus and technique for storing optical information in the form of light images on a deformable storage medium.

It is still another object of the invention to provide a high density information storage system.

Other objects and advantages of the invention will be apparent from the following description and drawings.

Briefly, the present method and apparatus contemplates direct conversion and storage of information on a deformable photoconductive medium without the intervention of a temporary storage medium. Accordingly, information to be stored is transmitted by activating radiation onto a uniformly charged deformable photoconductive medium and by reason thereof, the photoconductive medium becomes selectively discharged according to the pattern of the activating radiation. The now selectively charged photoconductive medium is developed by softening the deformable medium so that the forces of the electrostatic charge pattern deform the medium in accordance therewith. The formation of the charge pattern corresponding to the information to be stored directly on the deformable storage medium obviates any transfer voltage.

Certain advantages of the invention can be demonstrated by comparing the present method for direct printing of information to known photographic techniques. In ordinary photography, a reversed image of the information is generally obtained on a transparency and the transparency thereafter exposed in combination with photosensitive paper to yield a positive print. The development of a visible image on both the transparency and positive print is generally accomplished by a wet process employing chemical developing agents. Printing of information can also be accomplished by an electro-photographic or xerographic technique which, although not requiring a wet process for the development of a visible image, still neccitates the use of developing agents generally in the form of finely divided electrostatically attractable material. One advantage for the present method of printing over both described photographic techniques is the elimination of developing agents since the deformations in the deformable medium constituting a visible image are created merely by heating the medium. Still another photographic method for printing produces a color change on photosensitive printing paper in accordance with the received pattern of activating radiation. While eliminating the need for external developing agents to produce a visible image, the photosensitive papers employed in this technique possess poor stability to ordinary light, especially after exposure. In addition, an advantage of the present method over all the photographic methods above described is obtained by printing the visibile image on a deformable medium which permits erasure and re-use of the medium. Other advantages will become apparent as will be disclosed in greater detail in the description of the preferred embodiments of the invention.

The invention may be practiced in a preferred embodiment as illustrated in the following description taken in connection with the accompanying drawings in which.

Figure 1:
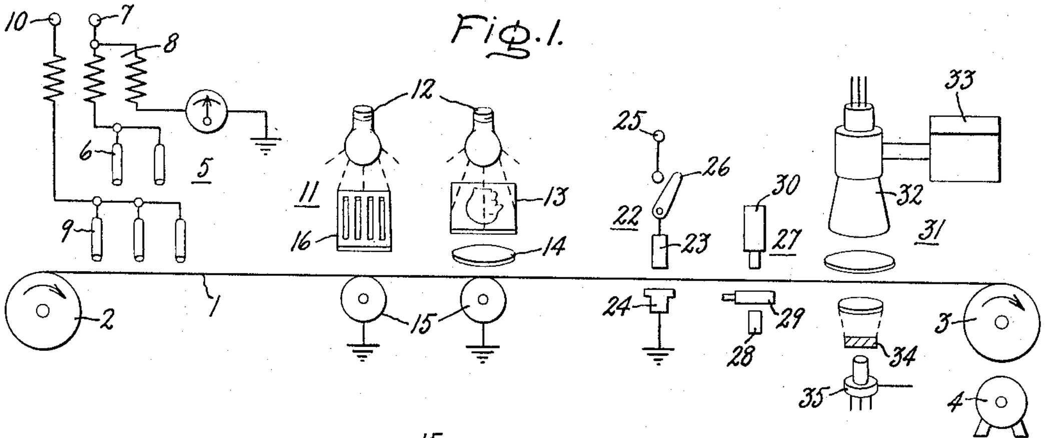
FIGURE 1 is a schematic representaiton of one form of an apparatus for carrying out the direct deposition, development, and storage of a light image on the same deformable medium.

In FIGURE 1 of the drawings, an information recording and storage system is depicted whereby light images are continuously recorded and stored on an electrostatically charged deformable photoconductive medium, the recorded light images are developed to by heating the deformable medium, and finally the deformations are read by means of a Schlieren optical system. Transport means are shown for conveying the deformable photoconductive medium between the various stations which perform the functions outlined. Accordingly, a deformable photoconductive medium 1 which is shown in the form of a thin tape, is conveyed from a storage reel 2, by means of a driven wind-up reel 3 provided with motive power by such means as motor 4, to the first station where the deformable photoconductive medium is electrostatically charged uniformly by such means as corona generator 5 illustrated generally.

The corona generator 5 includes a first set of corona-forming wires 6, positioned above the deformable medium and energized from a source of unidirectional energizing voltage appearing at the input terminal 7. The D.C. energizing voltage appearing at the input terminal 7 and applied to the corona wires through a dropping resistance 8, is of the order of 7500–8000 volts and produces a voltage gradient between corona-forming wires 6 and the deformable medium high enough to produce a corona discharge. The ions from the corona discharge are accelerated by means of a set of wire electrodes 9 disposed between the corona-forming wire 6 and the deformable medium 1. The wires 9 are energized from a source of unidirectional voltage supplied at a second input terminal 10 to produce an electrostatic field which accelerates the ions toward the deformable medium 1, charging it uniformly. The accelerating wires 9 and the corona-forming wires 6 are staggered so that passage of the ions between the accelerating wires 9 to deformable medium 1 is facilitated. The accelerating wire electrodes 9 also function as arc-over protective electrodes to guard against arc-over between the corona-forming wires 6 and the deformable medium 1.

The uniformly charged deformable medium 1 is next transported to recording station 11 where it is exposed to the image which is to be stored. The preferred type of activating radiation employed in the present embodiment for projecting the image on the deformable medium is ultraviolet radiation and is pictorially represented in the form of an ordinary lamp 12. The light source 12 is positioned above a transparency 13 containing an image to be recorded so as to shine the light or other radiation through the transparency and onto the surface of the deformable photoconductive medium 1. It will be realized that the image to be recorded can be simply one or more holes in an otherwise opaque medium so that the activating radiation is projected onto the deformable medium through such openings instead of the photographic-type transparency illustrated. Also, it will be obvious that where the image is of a photographic type, that such image must be transparent to the type of activating radiation employed, for example, ultraviolet radiation. The light image projected from the transparency is next transmitted through a lens 14 positioned to intercept the light image and focus it on deformable medium 1. The light image impinging on deformable medium 1 changes its conductivity in accordance with the intensity of the impinging light so that the electrostatic charge leaks off through grounding means 15 to leave a charge pattern on the deformable medium which corresponds to the impinging light image. That is, a photoconductive deformable medium, such as an equipart mixture of anthracene with low molecular weight polystyrene is characterized by the fact that it has a dark resistivity of approximately $10^{15}$ ohm-centimeters when unexposed to light. When the deformable thermoplastic is illuminated, however, the resistivity of this mixture drops sufficiently to permit conduction of the electrostatic charge to ground in the pattern described. The ease with which the deposited charge at any point on the surface of the deformable photoconductive medium proceeds through the material to the grounding medium 15, which for the present embodiment consists simply of a metal roll contacting the deformable medium, is determined by the intensity of the impinging light at that point. Hence, a charge pattern is produced on the surface of the deformable photoconductive medium 1 which has a point-by-point correspondence with the light intensity variations of the image.

In storing the optical information by producing a charge pattern in response to a light image, it is desirable under many circumstances to dissect the light image and store it as an extremely fine solid line or linear dot pattern rather than in a continuous point-by-point fashion. That is, the image is dissected and stored in a manner analogous to that by which a television picture is produced by breaking the image into 525 or so individual segments or lines each of which is modulated in intensity. The charge pattern representing the light image is similarly fragmented into a plurality of spaced charge-bearing strips separated by corresponding uncharged strips. Each charged strip on the deformable medium bears a charge distribution which corresponds to the light intensity variations of the corresponding image element.

The reason for depositing the image onto a charge pattern having a line structure of this type can be explained in part by the characteristics of the mechanism for retrieving the information. Information retrieval takes place using a beam of light which is deflected or refracted by the information bearing deformations. The light deflection or refraction is produced by passage of the light through the sloping sides of the deformations. Therefore, if a large white area of an image is to be recorded on a point-by-point basis from a negative, the white area on the image appears as a dark area on the negative and little or no light passes through the negative. As a result, the charge density at this point on the pattern would be high and little or no charge would have leaked off. When the deformable photoconductive medium containing the charge pattern is heated, a large shallow groove having a flat bottom is formed. The light passing through the groove is not bent at the large flat portion but only at the sloping side and hence, is sensed. Consequently, the large white area is not reproduced as such during retrieval. By dissecting the image into a plurality of elements and producing a fine line charge pattern, many small deformations, rather than a single large groove, are produced so that the readout beam functions in the proper manner.

Accordingly, before projecting the light image from the photographic transparency 13 to be reproduced, the deformable photoconductive medium 1 is discharged selectively by a beam of an ultraviolet lamp 12 projected through a bar or grid arrangement 16. It should be noted that for simplicity of illustration, ultraviolet lamp 12 is depicted in FIGURE 1 as a continuous light source. For proper operation to form a plurality of individual charged strips 17 on a moving deformable medium 1, it will be realized that the light source must necessarily be interrupted by conventional means. The bar or grid 16 contains a grating structure of alternately transparent and opaque portions so that a plurality of individual parallel spaced light beams is projected onto the deformable photoconductive medium 1. The uniformly distributed charge on the deformable photoconductive medium 1 is converted to a line pattern, as may be seen most clearly in FIGURE 2. The line pattern consists of a plurality of charged strips 17 where the projected light was blocked by the opaque bars in the screen 16, separated by a plurality of uncharged portions 18 where the individual light beams from the grid arrangements 16 struck the deformable photoconductive medium changing the conductivities sufficiently to cause the charge to leak off in that portion of the deformable medium 1.

After the deformable photoconductive medium 1 has thus been conditioned to produce a uniform line charge structure, the deformable medium next proceeds to the photographic image to be recorded, wherein a light image projected through the transparency is focused by lens 14 onto the deformable medium 1. Again it will be realized that for the recording of a sharp light image on the movable storage medium, that the light source must be interrupted by conventional means. The light image thereby selectively discharges the charged strips 17 in accordance with the light intensity variations of the image to form a charge pattern corresponding to the light image. Dissection of the light image may be achieved in other known ways than that illustrated in FIGURE 1. For example, it is equally feasible to utilize a mosaic of rectangular charged portions aligned in horizontal and vertical rows, in which case, the bar or grid arrangement 16 is constructed as a screen rather than as a plurality of spaced bars.

Figure 2:
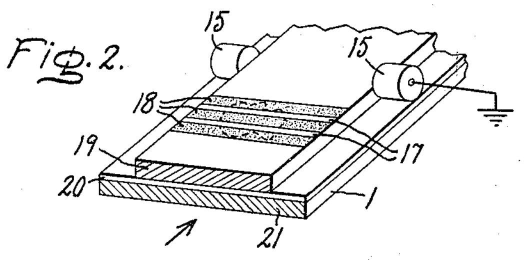
FIGURE 2 is a perspective partially sectional view of one form of the deformable medium of the invention.

The recording of a light image on the deformable photoconductive medium and its subsequent development to produce deformations in accordance with the image pattern can best be understood by reference to FIGURE 2 wherein the construction of such a deformable medium is shown generally. A more detailed description of the composition of the deformable medium and its construction is given hereinafter. In FIGURE 2 a preferred embodiment of the deformable storage medium includes a thin photoconductive thermoplastic film 19, overlying an electrically conductive innerlayer 20 and a dielectric base layer 21. In order that the information recorded on the storage medium may be retrieved at a read-out station wherein by the preferred means shown in FIGURE 1, and to be further explained hereinafter, a beam of light is projected through the entire storage medium 1, it is necessary that all layers of the storage medium be optically transparent. The photoconductive thermoplastic film 19 is electrostatically charged in a uniform manner merely by exposure to the direct path of the preferred corona generator 5 shown in FIGURE 1. A latent image is produced on the uniformly charged thermoplastic film 19 by exposing the film at recording station 11 to a light image which selectively discharges the film in accordance with the projected image pattern through the means of grounding rolls 15 which contact the electrically conducting layer 20.

In FIGURE 2, it is shown that the grounding rolls 15 contact the electrically conducting layer 20 after the photoconductive thermoplastic film 19 has been exposed to the light image. With the arrangement shown, it has generally not been found necessary to apply a transfer voltage in order to selectively discharge the photoconductive thermoplastic film. After the thermoplastic film has been selectively discharged in accordance with the image pattern, the storage medium is developed by softening the thermoplastic film so that the forces due to the remaining electrostatic charge pattern produce deformations in accordance with the latent image pattern.

To develop the latent image charge pattern, the deformable storage medium next proceeds to a heating station 22 where the thermoplastic film 19 is softened and deformed in accordance with the image charge pattern. Heating station 22 comprises a pair of spaced electrodes 23 and 24 which are energized by a high-frequency voltage. The high-frequency voltage induces a circulating heating current in the conductive innerlayer 20 of the deformable photoconductive medium 1 to heat and soften the thermoplastic film 19 so that the forces produced by the electrostatic charge pattern deform the softened film. The electrodes 23 and 24 are connected to a source of high-frequency energy, such as a radio-frequency oscillator (not shown) which supplies the energizing voltage to an input terminal 25. The electrodes are energized by closure of a switch 26 connected between the terminal 25 and one of the electrodes. For the purpose of simplicity of illustration, switch 26 has been shown as manually operated. However, it will be obvious to those skilled in the art, that the operation of the energizing switch could easily be synchronized with the transport motor 4, wherever it would be desirable to do so. More specifically, it will generally not be necessary to energize the heating station unless the tape is being transported after exposure to a light image.

After heating, the deformable storage medium is preferably transported to a viewing microscope assembly 27 provided to permit the operator to observe the surface of thermoplastic film 19 and determine the nature and characteristics of deformations on its surface. The viewing microscope assembly 27 is preferably a phase contrast microscope which is particularly useful in observing minute physical differences. Microscope 27 includes a light source 28 and a phase contrast condenser assembly 29, which introduces a fixed phase difference between light ray components passing through the deformation peaks and those passing through valleys. In order to utilize such microscope means, it is necessary, as stated hereinbefore, that all layers of the deformable photoconductive medium be transparent so that visible light may be projected through the medium. The phase difference produced by light ray components passing through the deformation peaks and valleys of the thermoplastic film 19 results in interference between the light components to yield a perceptible image in the microscope objective and eye piece assembly 30 though only minute differences in thicknesses exist. Phase contrast microscope assemblies of this type are well known in the art and it is not believed that further discussion thereof is necessary. For a detailed discussion of phase microscopes, reference is made to the text, "Phase Microscope" by Bennett, Jupnik, Osterberg, and Richards, John A. Wiley and Sons, New York (1951).

The deformed photoconductive medium is next transported to read-out station 31 where the information stored on the medium is retrieved as a light image and converted to electrical signals corresponding to the stored image. A scanning light source is provided in the form of a flying spot scanner cathode ray device 32 energized from a suitable sweep circuit indicated at 33. The flying spot scanner 32 includes an electron beam which is deflected by a sweep signal from circuit 33 to scan the beam in a predetermined pattern across the face of cathode ray device 32. The cathode ray device 32 has a transparent phosphor deposited on its face so that the impinging beam produces a spot of light at the point of impact. By deflecting the beam both in the horizontal and vertical directions, a continuously scanning spot of light is produced. The light beam from the flying spot scanner is projected through the deformed storage medium 1 onto a Schlieren optical system shown generally at 34. A photosensitive device 35 positioned behind the Schlieren arrangement 34 produces electrical signals in response to the light passing through the Schlieren system.

Figure 3:
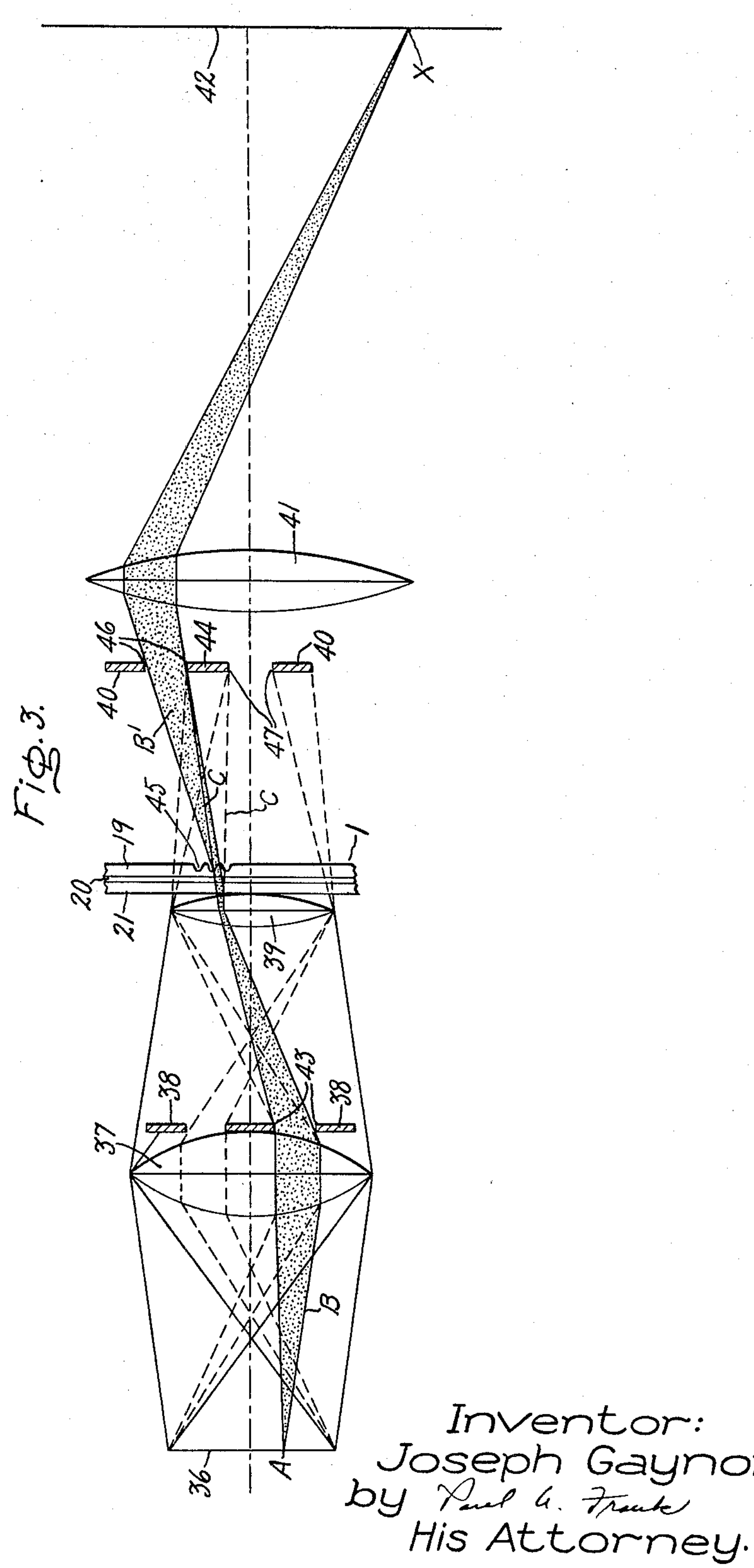
FIGURE 3 is a schematic illustration of a Schlieren optical system which may be used for reading the information stored on the deformable medium of the invention.

The Schlieren optical system 34 may best be understood by referring to FIGURE 3 of the drawings where a detailed schematic illustration of a multiple bar Schlieren optical read-out system is shown in place of the single block member 34 of FIGURE 1. A more detailed description of a comparable system may be found in U.S. Letters Patent 2,813,146, by William E. Glenn, isued November 12, 1957. In the present system, a projection light source shown at 36 emits rays of light which are focused by lens 37 and passed through a bar system 38 having spaced light transmitting apertures. Light beams passing through the apertures of bar system 38 are normally focused by a lens 39 to form an image of the operation on corresponding light blocking bars of a second bar system 40. In the absence of any deflection or refraction of light rays traveling between the bar systems 38 and 40, the light is completely blocked and no light reaches field lens 41 and screen 42. If, however, the light rays are deflected or refracted in passing between the two, the light is no longer completely blocked by the bars, and a portion passes through the apertures focusing on the projection screen 42. The amount of light passing through the bar system 40 is proportional to the amount of deflection or refraction which is controlled by the slope of the deformations on the deformable storage medium 1.

The light source 36 is illustrated as a line source of light composed of an infinite number of point sources. A portion of the light from point source A shown in the form of dappled beam B is focused by lens 37 to pass through aperture 43 of bar system 38 and then through lens 39 which normally projects an image of aperture 43 onto a light blocking bar 44 of grating 40. By placing deformed storage medium 1 between lens 39 and grating 40, light beam B in passing through a typical set of deformations, illustrated by the deformations 45, is deflected in all directions so that a portion thereof is deflected sufficiently so that it no longer strikes the light blocking bar 44, as shown by lines *c—c*, but passes through aperture 46. A typical bundle of deflected light rays, shown as deflected beam B′, passes through aperture 46 to lens 41 to be focused thereby at the point X on screen 42. The light characteristics, such as the intensity, at point X on screen 42 then correspond to the information stored on deformable medium 1 in the deformations 45. Another portion of the light (not shown) also deflected by the deformations 45 passes through the lower aperture member 47 focused at point X on screen 42. However, for simplicity of illustration, this latter beam of light as well as the light beams due to other deformations are not shown in FIGURE 3.

Each point on the line light source 36 may be similarly considered as furnishing an independent source of light and contributing to the final illumination of the point X on the screen 42. The amount by which the elemental portion 45 deflects the light to control the screen illumination is a function of the spacing between the deformations, since the angle of deflection or of refraction depends on the slope of the deformations, while the attenuation of the light intensity by the deformation is a function of the depth of the deformations so that the total intensity of illumination at any point X on screen 42 is a function both of the spacing as well as depth of the deformations, illustrated at 45. Although in order to simplify description, in FIGURE 3, only a single group of deformations is shown on storage medium 1. The remaining portions of the deformable storage medium 1 contain similar deformation patterns so that light is transmitted through each of the elemental portions of the medium, illuminating the entire screen 42 and the recorded information is produced as a spatial light image corresponding to the original image. The projection screen 42 illustrated in FIGURE 3 may be replaced by a light sensitive electron-optic device such as a photo-multiplier or the like which converts the projected spatial light image into electrical signals so that the information may be retrieved electrically rather than visually.

It must be pointed out that, although FIGURE 1 shows the read-out or retrieval station 31 in close physical proximity to the recording and heating stations so that readout takes place immediately after storing the information, the invention is not limited to an immediate retrieval system. Under many circumstances, however, an immediate retrieval system is desirable. For example, in an aerial survey arrangement, it is desirable to take a picture in the aircraft, store it on the deformable storage medium, retrieve the information from the medium, and convert it to an electrical signal which may then be transmitted from the aircraft to the ground. In such an environment, the immediate readout after storage is both useful and desirable.

Figure 4:
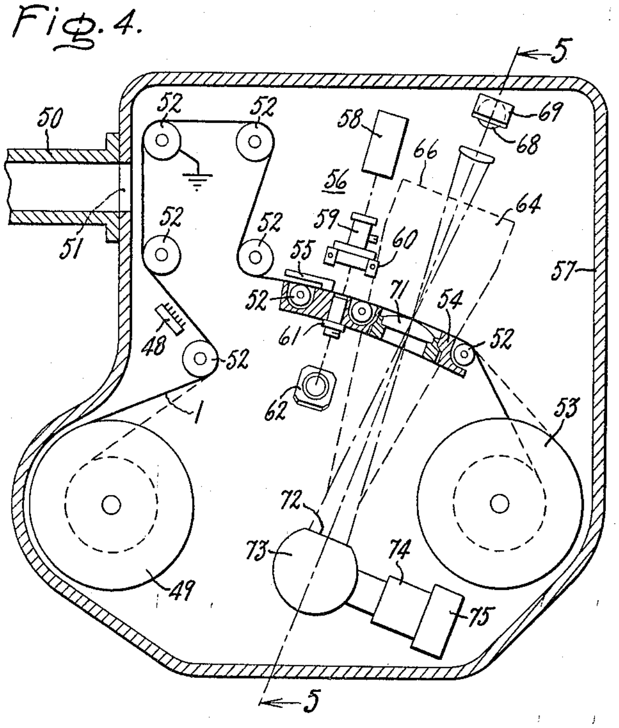
FIGURE 4 is an other schematic representation of one form of an apparatus for automatically storing information according to the method of the invention.

FIGURE 4 illustrates a preferred embodiment of the invention which permits compact recording and immediate readout of the stored information. A direct image storage system is shown which stores optical information directly on the deformable storage medium at high speeds with high storage density, and without need for an electron beam. In FIGURE 4, deformable storage medium 1 is uniformly charged, before it is pulled into position for exposure, by means of a corona charging device 48 located adjacent to a supply reel 49. The uniformly charged deformable medium 1 is next transported to a light exposure box 50. While, for simplicity of illustration, the light exposure box 50 is merely shown as a device which will receive a visible image and includes a lens 51 for focusing the image on the charged deformable medium 1, the exposure box 50 can contain all of the elements of the recording station 11 shown in FIGURE 1.

After exposure to activating radiation, deformable storage medium 1 is transported by means of idler pulleys 52 and a take-up spool 53 to a position where the latent image pattern is developed. The latent image pattern is produced by selectively discharging the exposed deformable medium through means of an electrically grounded idler pulley prior to transporting the exposed deformable medium to the development station. After passing over idler pulleys 52, the exposed deformable medium passes over a tape guide 54, one end of which supports high-frequency heating electrodes 55 so that the deformable photoconductive medium is heated in passing between these electrodes to produce deformations corresponding to the latent image pattern. After passing between high-frequency electrodes 55, the deformed storage medium 1 passes through the viewing field of a phase contrast microscope 56, fastened to the housing 57.

Phase microscope 56 includes a light source 58, phase contrast condenser assembly 59 supported in a mounting bracket 60 secured to housing 57, a phase microscope objective 61 threaded into and secured by tape guide 54, and an eye piece 62 extending into the plane of the paper and through housing 57 to the exterior of the housing. Microscope 56, as discussed previously, facilitates observation of the deformable storage medium to ascertain whether the information has been properly stored.

Figure 5:
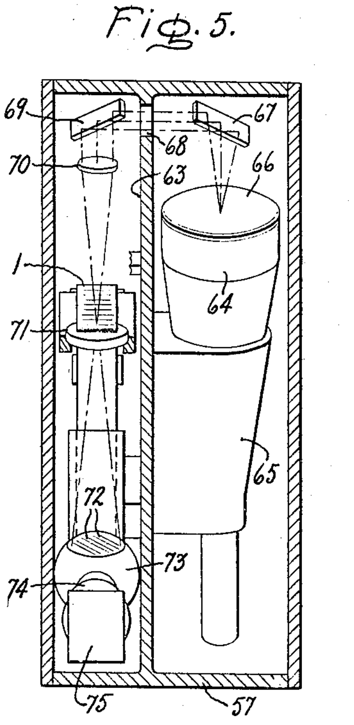
FIGURE 5 is a sectional view taken along line 5—5 of FIGURE 4.

The electro-optical read-out system for the information stored on the deformable storage medium in the form of electrical output signals may be seen most clearly in conjunction with FIGURE 5 which is a sectional view taken along lines 5—5 of FIGURE 4. In FIGURE 5 the housing 57 is divided into two separate chambers by means of a dividing wall 63. Positioned in the right-hand chamber is a light source comprising a flying spot scanning device 64 secured in a suitable mounting bracket 65. The electron beam moving across the tube face 66 produces a moving spot of light which is reflected by a 45 degree mirror 67 through an opening 68 in wall 63. The light is intercepted by a second 45 degree mirror 69 and projected downwardly through lens 70 onto the deformable storage medium 1.

The light passes through the deformable storage medium 1 and is deflected an amount controlled by the spacing and depth of the light modifying deformations on the deformable photoconductive medium. The deflected light is projected by lens 71 secured to tape guide 54 onto a Schlieren bar system 72 mounted in an opening of a light integrating sphere 73. The scanning light beam is normally blocked by bars 72 and passes through the apertures between the bars to the interior of the integrating sphere only if the tape bears the deformations. Light passing into integrating sphere 73 is gathered and focused on the photo-sensitive electrode of a photomultiplier 74 extending into the sphere. An amplifier 75 is electrically connected to the output of the photomultiplier 74 to amplify the output signals.

It can be seen that a direct image storage system has been described which stores optical information directly on a deformable storage medium at high speeds with high storage density, and without the need for an electron beam.

The information storage medium of the present invention comprises a deformable photoconductive film overlying an electrically conductive innerlayer and a dielectric support layer. The information storage medium may be prepared by depositing a thin film of an electrically conductive material on the dielectric support layer and thereafter applying a coating of the deformable photoconductive substance according to known means. For example, it has been found possible to vapor deposit a thin metallic film on the dielectric support layer, coat the vapor-deposited metallic film with an organic solvent solution of a deformable photoconductive film-forming substance, and remove the solvent to yield the solid information storage medium. It is preferred that the electrically conductive innerlayer not be completely sandwiched by the deformable photoconductive film and dielectric support layer. For example, as will be seen by referring to FIGURE 2, it is preferred that one or more strips of the electrically conductive innerlayer be exposed in the information storage medium so that the exposed strips may be contacted by a means for electrically grounding the storage medium such as the rolls 15 shown in said drawing. The purpose for grounding a portion of the electrically conductive innerlayer in the information storage medium is to permit the selective discharge of the deformable photoconductive film in accordance with the latent image pattern thereon. It is likewise preferred that all components of the information storage medium be optically transparent to permit reading of the stored information by the viewing microscope and Schlieren system heretofore described. While it is preferred that the information storage medium be of a transparent nature and in the form depicted in FIGURE 2, it is not intended to limit the invention thereto. It will be obvious to those skilled in the art that other known means may be employed for the selective discharge of the storage medium as well as for the optical retrieval of the information therefrom.

The deformable photoconductive film 19 of the information storage medium can be characterized as a film-forming solid which is itself photoconductive or which by the addition of photoconductive materials thereto can be rendered substantially photoconductive. In use in the invention, the photoconductive materials are electrical insulators in the dark but become partial electrical conductors when illuminated. The response of these photoconductors to light is reversible in that the materials again become insulating when illumination is removed. The class of useful photoconductive materials is understandably a broad one and includes such diverse materials as thermoplastic photoconductive polymers, mixtures of inorganic photoconductive solids with thermoplastic non-photoconductive polymers, and mixtures of organic photoconductive compounds with thermoplastic non-photoconductive polymers. Suitable thermoplastic photoconductive polymers include ring substituted aromatic polymers with the substituents selected from the group consisting of halogen, amine, sulfur-oxide and nitrogen-oxide radicals such as substituted diphenyl polymers and the like. The inorganic photoconductive materials which can be added to a thermoplastic polymer in order to render the entire mixture substantially photoconductive, can be selected from the class of elemental compounds such as selenium and sulfur, phosphors, and even solid solutions of mixed crystals. Suitable organic dyes include crystal violet, malachite green, basic fushin, trypaflavine methylene blue, pinacyanole, kryptocyanine, neocyanine, and certain proteins. The photoconductors for admixture with the organic polymers are semiconductors which may be further characterized as being photoconductive under ordinary conditions, chemically unreactive in such a manner as not to lose photoconductivity in the mixture, and having a dark resistivity of at least $10^{11}$ ohm-centimeters. The thermoplastic organic polymers suitable either as the photoconductive medium itself or as an element in a mixture with a photoconductor can be characterized by a substantially infinite room temperature viscosity and a relatively fluid viscosity temperature of 100–150° C., together with a relatively high electrical resistivity in ohm-centimeters. In addition, the preferred thermoplastic organic polymers are transparent to visible radiation for optical readout by the means heretofore described. It is not believed that the selection of a particular thermoplastic organic polymer for admixture with a photoconductor is critical to the practice of the invention and suitable polymers include acetals, acrylics, polyesters, silicones, and vinyl resins having the above described properties. It is obvious that mixtures of thermoplastic organic polymers may be employed satisfying all of the above requirements and one mixture found satisfactory is a blend of polystyrene, m-terphenyl, and the co-polymer of 95 wt. percent of butadiene with 5 wt. percent of styrene, in the ratios of 70% polystyrene, 28% n-terphenyl, and 2% of the co-polymer. Further, the thickness of the deformable photoconductive medium is not believed to be critical to the practice of the invention and successful results are achieved with film thicknesses varying from about 0.1 mil to several mils with the preferred thickness being about equal to the minimum distance between deformations to be stored on the film.

The electrically conductive innerlayer element 20 may be best characterized by its purpose in the information storage medium of the invention. The conductive innerlayer serves two purposes, namely, (1) to provide the means for selectively discharging the uniformly charged deformable photoconductive film 19 of the information storage medium, and (2) to constitute the heating element for deforming the selectively discharged photoconductive film by the above described high-frequency heating means. Suitable electrically conductive films have a resistivity in the range of about 1000–10,000 ohms per square centimeter, are adherent to both the deformable photoconductive film and the dielectric support layer, and are thermally and chemically stable at the temperatures of 100–150° C. employed to deform the photoconductive film. The preferred electrically conductive films are optically transparent to permit readout of the stored information by the phase-contrast microscope and Schlieren means above described. Suitable materials for the electrically conductive film include the metals, such as iron, tin, chromium, and nickel; the metallic oxides, such as stannic oxide and cuprous oxide; and the metallic salts, such as cuprous iodide.

A conducting film of cuprous iodide, for example, may be prepared by vacuum depositing a thin film of metallic copper on the surface of the dielectric support layer 21 and then exposing the copper coated layer to iodine vapor to form the desired cuprous iodide film. For a more detailed description of the method and apparatus for producing such a cuprous iodide film, reference is hereby made to U.S. Patent 2,756,165, entitled, "Electrically Conducting Films and Processes for Forming Same," by D. A. Lyon, issued July 24, 1956. The thickness of the film is not believed critical to the practice of the invention, although for optical transparency it is generally required that the film thickness be less than approximately 1 mil. This is not to imply that thinner films cannot be suitably employed since films having a thickness in the range 0.0004–0.004 mil are satisfactory.

The composition of dielectric support layer 21 may be characterized as a resinous material which is non-plastic at temperatures up to at least 150° C. and which possesses the well known dielectric properties for electrically insulating materials. The preferred materials for the dielectric support layer are optically transparent and may be selected from the general class of film-forming organic polymers including polyesters, epoxy resins, and polycarbonates. To further illustrate the preferred class of materials useful as the dielectric support layer, certain film base materials such as those sold by E. I. du Pont de Nemours & Company under the registered trademarks "Mylar" and "Cronar" have been successfully employed. The thickness of the dielectric support layer is not believed critical and excellent results have been obtained from a four mil thick strip.

It is not intended to limit the present invention to the preferred embodiments above described, For example, it is obvious that the types of activating radiation which may be employed to selectively discharge the photoconductive element include visible light, X-rays, gamma rays, and other penetrating radiation which act on the deformable photoconductive film by causing the material to become more conductive electrically. Also, it is obvious that equivalent elements may be substituted in the particular apparatus shown for recording and developing the image pattern on the deformable photoconductive medium. Still further, although the method disclosed in the above preferred embodiments employs means by which the information can be recorded and developed on a moving tape, it is obvious that the method contemplates an alternative process whereby the information is recorded and developed on such stationary storage mediums as slides and plates by known modifications in the disclosed method. It is intended to limit the present invention, therefore, only to the scope of the following claims.

What I claim as new and desire to secure by Letters Patent of the United States is:

1. The method for storing information on a deformable medium in an image pattern which comprises electrostatically charging a thermoplastically deformable photoconductive medium to establish a uniform charge pattern on its surface, selectively discharging portions of the uniform pattern by activating radiation to yield a latent electric charge image pattern, and heating the deformable medium to reduce the viscosity thereof and produce physical deformations corresponding to the latent electric charge image pattern by forces resulting from said latent electric charge image pattern.

2. The method for storing information on a deformable medium in an image pattern which comprises electrostatically charging a thermoplastically deformable photoconductive medium to establish a uniform charge pattern on its surface, selectively discharging portions of the uniform pattern by exposure to a light image in accordance with the light intensity variations of an image to yield a latent electric charge image pattern, and heating the deformable medium to reduce the viscosity thereof and produce physical deformations corresponding to the latent electric charge image pattern by forces resulting from said latent electric charge image pattern.

3. The method for storing information on a deformable medium in an image pattern which comprises electrostatically charging a thermoplastically deformable photoconductive medium to establish a uniform charge pattern on its surface, selectively discharging portions of the uniform pattern by exposure to activating radiation and contacting the deformable medium with electrically grounding means to yield a latent electric charge image pattern, and heating the deformable medium to reduce the viscosity thereof and produce physical deformations corresponding to latent electric charge image pattern by forces resulting from said latent electric charge image pattern.

4. The method for storing information on a deformable medium in an image pattern which comprises electrostatically charging a composite recording member comprising a thermoplastic film having a photoconductive material incorporated therein to establish a uniform charge pattern on the surface of the thermoplastic film, selectively discharging portions of the uniform pattern by activating radiation to yield a latent electric charge image pattern, and heating the thermoplastic film to reduce the viscosity thereof and produce physical deformations corresponding to the latent electric charge image pattern by forces resulting from said latent electric charge image pattern.

References Cited by the Examiner

UNITED STATES PATENTS

| | | | |
|---|---|---|---|
| 2,756,676 | 7/1956 | Steinhilper | 96—1 X |
| 2,892,380 | 6/1959 | Baumann et al. | 88—61 |
| 2,896,507 | 7/1959 | Mast et al. | 88—61 |
| 2,959,481 | 11/1960 | Kucera | 96—1 |
| 2,975,758 | 3/1961 | Bird | 96—1 |
| 3,008,825 | 11/1961 | Van Dorn et al. | 96—1 |
| 3,055,006 | 9/1962 | Dreyfoos | 346—74 |
| 3,113,022 | 12/1963 | Cassiers et al. | 96—1 |
| 3,113,179 | 12/1963 | Glenn | 96—1 |
| 3,121,006 | 2/1964 | Middleton et al. | 96—1 |
| 3,124,483 | 3/1964 | Rheinfrank | 96—1 X |
| 3,131,019 | 3/1964 | D'Antonio | 96—1 |
| 3,155,503 | 11/1964 | Cassiers et al. | 96—1 |
| 3,159,483 | 12/1964 | Behmenburg et al. | 96—1 |

FOREIGN PATENTS

| | | |
|---|---|---|
| 1,214,398 | 4/1960 | France. |

OTHER REFERENCES

Publication: "TPR" Recording Electronic Industries, February 1960, vol. 19, No. 2, pp. 76–79.

NORMAN G. TORCHIN, *Primary Examiner.*

NEWTON N. LOVEWELL, DAVID G. REDINBAUGH, R. M. HESSIN, A. L. LIBERMAN, C. E. VAN HORN, *Assistant Examiners.*

Notice of Adverse Decision in Interference

In Interference No. 96,240 involving Patent No. 3,291,601, J. Gaynor, PROCESS OF INFORMATION STORAGE ON DEFORMABLE PHOTOCONDUCTIVE MEDIUM, final judgment adverse to the patentee was rendered Oct. 21, 1969, as to claims 1, 2 and 4.

[*Official Gazette March 17, 1970.*]